May 8, 1956  J. SALAUZE  2,744,948
PRIMABLE ELECTRIC BATTERIES EMPLOYING CUPROUS CHLORIDE
Filed Nov. 6, 1953
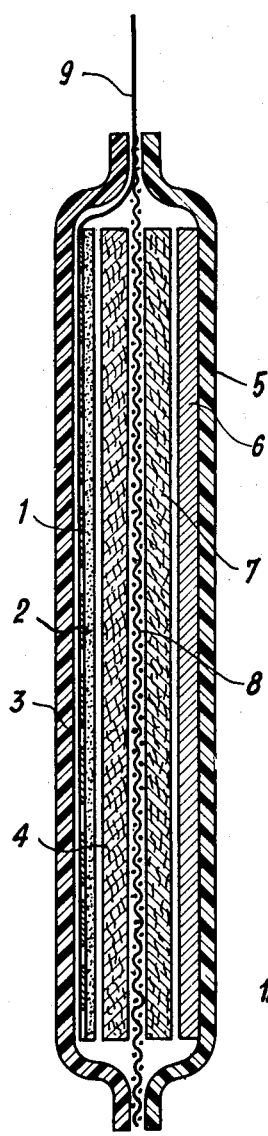
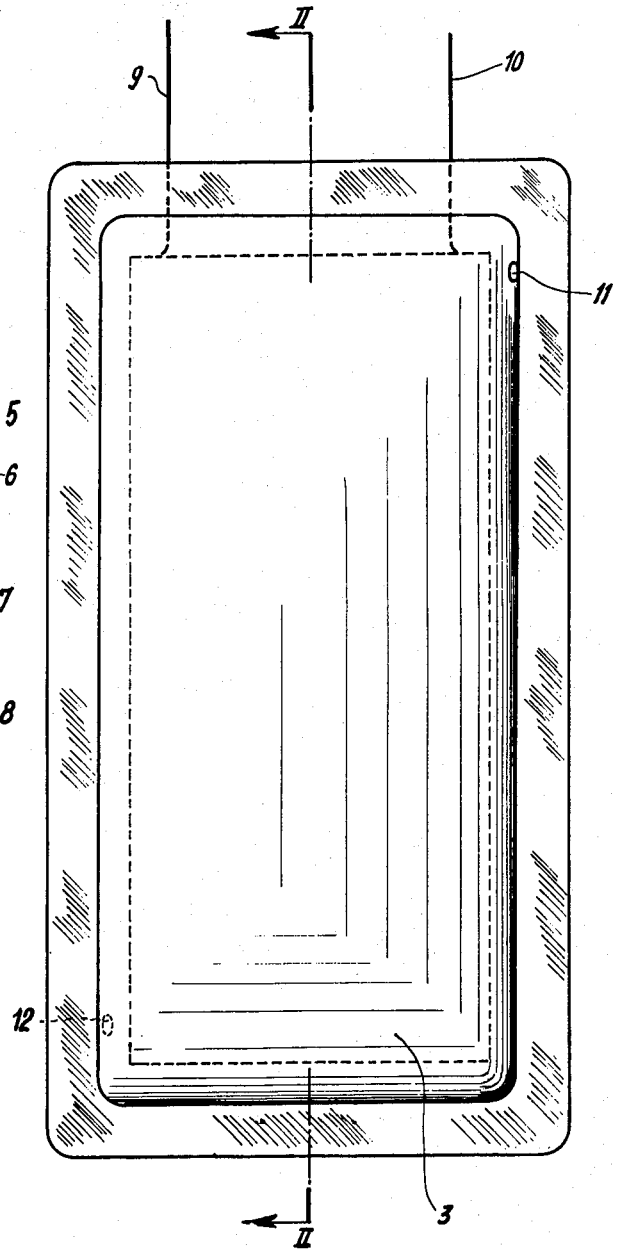
INVENTOR.
JEAN SALAUZE
BY
*Kenyon & Kenyon*
ATTORNEYS

United States Patent Office 2,744,948
Patented May 8, 1956

2,744,948

PRIMABLE ELECTRIC BATTERIES EMPLOYING CUPROUS CHLORIDE

Jean Salauze, Paris, France, assignor to Société des Accumulateurs Fixes et de Traction (Société Anonyme), Romainville, France, a French company Application November 6, 1953, Serial No. 390,671

Claims priority, application France November 19, 1952

15 Claims. (Cl. 136—100)

Electric batteries are already known, the electrodes of which are respectively composed of cuprous chloride and magnesium. It is also known that such batteries, which are assembled in the dry state, may be activated or primed with pure water.

In the known forms of embodiment of these batteries, the cuprous chloride is formed as an agglomerate in a thin sheet against a sheet of copper in order to constitute the positive pole of the battery.

An electrode made up in this way has certain disadvantages since the cuprous chloride is not very soluble in pure water and its proper conductivity is poor. As a result, the conductivity of the electrode is very variable over the whole surface of the plate and the efficiency of the cuprous chloride is low.

The present invention is intended to overcome the said defects.

In accordance with the invention, the member which supports or carries the cuprous chloride is constituted by a porous body obtained by sintering of fine copper powder in a reducing atmosphere.

The cuprous chloride (CuCl) in the soluble state may be directly incorporated in this support by way of liquid penetration, the electrodes prepared in this way being subsequently dried-off.

A support of this kind is preferably impregnated with cupric chloride ($CuCl_2$) which reacts with the copper of the porous support in order to give cuprous chloride, in accordance with the following reaction:

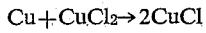

$$Cu + CuCl_2 \rightarrow 2CuCl$$

The electrodes prepared in this way, in addition to the simplicity of their manufacture and their very low cost of production, have the advantage of being very porous which enables them to be perfectly impregnated when being primed.

In addition, their porous conductive structure gives them a conductivity which is much higher than that of known types of electrodes of cuprous chloride, and this conductivity is furthermore uniform over the whole surface of the electrode, which ensures uniformity of potential and, in consequence, an identical development of the electro-chemical reactions throughout the whole surface of the plate. Finally, the active material is uniformly distributed throughout the whole mass of the conductive structure.

A positive electrode of this kind may be associated, in any known manner, with a negative electrode of magnesium.

In an advantageous form of embodiment of a battery comprising these two electrodes, each of them is placed in a container of weldable plastic material and the two containers are welded edge to edge with the interposition of a separator preferably formed by a cotton fabric, the edge of which is with advantage pinched between the edges of the two flat containers. The assembled battery is thus separated into two compartments, the anode and the cathode, and this avoids all risk of short circuits in the interior of the battery.

The description which follows below with respect to the attached drawings (which are given by way of example only and not in any sense by way of limitation) will make it quite clear how the invention may be carried into effect.

Fig. 1 is a plan view to an enlarged scale, of a battery constructed in accordance with the invention.

Fig. 2 is a section along the line II—II of Fig. 1, before the two halves of the casing of the battery have been welded together.

Before proceeding to the description of the arrangement shown in the drawings, the following example of construction of an electrode in accordance with the invention, will show exactly the method of operation by which these electrodes are obtained.

Example

The powdered copper employed is of the acicular or needle-shaped form, in other words of interlacing form, obtained, for example, by electrolytic means. This form lends itself well to agglomeration. The apparent density of this powder is 0.9, and it is sintered at 700 degrees for half an hour in an atmosphere of hydrogen, on a support consisting of a thin perforated sheet of copper having a thickness of 0.1 mm., this foil being previously flattened by annealing. There can be obtained in this way a sintered plate having a thickness between 0.5 and 1 mm. The apparent density of the copper powder being very low, the sintered bodies obtained have a great porosity which is about 80% of the total volume and so are able to carry a great amount of copper salt in their pores.

This plate is first of all dipped for a few seconds in a boiling solution of cupric chloride of 400 g./l., to which is added 1 cc. of hydrogen chloride of 22 degrees Bé. per 100 cc. of solution, so as to have a pH value equal to 1. The plate is then dried in an oven at 100° C., until the weight remains constant, this operation taking about 20 minutes.

In order to increase the amount of copper chloride deposited within the pores, the above operation may be repeated several times.

In accordance with the reaction given above, the copper of the support member and the cupric chloride with which it is impregnated react one on the other to produce cuprous chloride. As this reaction is comparatively slow, it is desirable to allow the plates to "ripen" before they are used. In fact, freshly manufactured plates give results which are not so good as those obtained from plates which have ripened. This ripening, which takes several days, should also preferably be carried out in the absence of air.

There is, in addition, an advantage in facilitating the transformation into cuprous chloride of the cupric chloride which constitutes the outer coating layer of the support member, and which, in consequence, is not in direct contact with the copper, by an electrolytic treatment.

To this end, the plates are arranged on the cathode of an electrolytic bath made up of the impregnating solution, the anodes being made of copper. An electrolysis lasting a quarter of an hour with a current density of one ampere per square decimetre of the plate to be treated, has been found to be sufficient. By this treatment, at the same time as the cupric chloride is converted into cuprous chloride, the quantity of cuprous chloride distributed through the plate is increased and there is obtained a more constant value of electro-motive force from the batteries during their discharge.

Without going outside the scope of the invention, a number of alternative forms of embodiment may be incorporated in the method of construction of electrodes described in the above example, in particular in the preparation of the support of sintered copper powder. It is quite clear, in particular, that a grid-structure of copper may be substituted for the foil. Also, in the finished plate, the metallic structure constituted by this grid or this foil may be dispensed with altogether, the powder agglomerated by sintering having sufficient mechanical cohesion. For this purpose, there may be used a temporary supporting structure for the layer of powder which is to be sintered, this structure being constituted by a foil of material which is eliminated during the sintering process (by vaporisation for example). The different operations involved in the preparation of the plates may also be carried out in a continuous manner by manufacturing the plates in the form of a long continuous strip which passes through a succession of apparatus in which the various processes of preparation are carried out. In this case, the copper powder may be deposited on to the structure (permanent or temporary) by coating, that is to say by applying it in the form of paste to the surface of this support. After this operation, the band thus coated is dried, then sintered, then impregnated, etc., and finally is cut off into plates, if necessary.

A positive plate prepared in this way is ready to be associated with a negative plate of magnesium or of a suitable alloy of magnesium, in order to form a battery which can be primed or activated by water. The separator is made up of vegetable or synthetic fibre. If need be, the battery may be provided with a jellifying substance if the electrolyte is not sufficiently taken up by the swelling-out of the separator.

The attached drawings show one example of construction of a battery of this kind.

The positive plate, constituted by the perforated thin copper sheet 1, coated with sintered copper powder 2 which is impregnated with cuprous chloride, is placed at the bottom of a shallow tray 3 which is obtained, for example, by stamping out from a sheet of polyvinyl chloride. On this plate, there may be applied a layer of spongy material 4 which is inert and is intended simply to retain a certain amount of water at the moment when the battery is primed or activated; this layer may be constituted, for example, by a thin sheet of cotton (a felted layer of cotton fibres).

At the bottom of a second shallow tray 5, similar to the first, the negative plate is placed, this being constituted by a thin sheet of magnesium 6, the surface of which may be chromated in the known manner, in order to reduce its reactive property; a layer of cotton 7 may also be applied to this sheet.

Between the two shallow trays, there is arranged a fine close fabric 8 of cotton, the surface of which is preferably such that its edges extend beyond those of the two shallow trays throughout the whole of their periphery.

Conductors 9 and 10, positive and negative, and comprising bare copper wires, are welded, electrically for preference, to the positive and negative plates. These wires may also be sheathed in tubes of polyvinyl chloride; the end welded to the electrodes should then obviously be bared. These conductors, which form the terminals of the battery, pass out of their respective trays.

The edges of the trays 3 and 5 are then welded one against the other through the cotton fabric by thermal welding process, preferably at high frequency; at the same time, this welding ensures a water-tight passage of the conductors 9 and 10 through the trays.

After welding, the edges of the cotton fabric which extend beyond those of the trays may be cut away.

In this way, the anode compartment is strictly separated from the cathode compartment and any particles which become detached from the positive plate cannot cause an internal short-circuit between the two plates.

For activating the battery, two small openings 11 and 12 formed either beforehand or at the moment when they are required, are provided in the trays 3 and 5 respectively, and are preferably located in the two diagonally-opposite angles of the trays.

It is sufficient to immerse the battery, prepared in this way, in pure water for a period of one or two minutes to make it ready for use.

A battery made up of a positive plate prepared in the manner described in the example, having a thickness of 0.5 mm. and a surface area of 42.5 cm., associated with a negative plate formed from a sheet of magnesium of 0.2 mm. in thickness and having the same surface area, enables the following experimental results to be obtained:

The electro-motive force is about 1.60 volts. The battery is capable of supplying a discharge current of 100 ma. for 4 to 4½ hours. The discharge voltage is comprised between the limits of 1.46 and 1.50 volts.

These results, when applied to a cubic centimeter of positive plate, correspond to an output of 47 ma. and a capacity of 210 milli-ampere-hours.

Similar results have been obtained by using a positive plate of 1 mm. in thickness.

It will be quite clear that modifications may be made to the improved arrangements which have just been described above, in particular by the substitution of equivalent technical means, without thereby departing from the spirit or from the scope of the present invention.

What I claim is:

1. A method of manufacture of electrodes for electric batteries of the kind in which the active element of said electrodes is constituted by cuprous chloride (CuCl), said method consisting in first making a porous body formed essentially of electrolytic copper powder, sintering said copper powder on a suitable carrying-base to form an agglomerate, impregnating said porous body with a solution of cupric chloride ($CuCl_2$), the said cupric chloride reacting with the said porous copper body to give cuprous chloride, and finally drying the electrode thus produced.

2. A method of manufacture of electrodes for electric batteries in which the active element is constituted by cuprous chloride (CuCl), said method comprising the production of a porous body consisting essentially of electrolytic copper powder, sintering said powder on a thin sheet of metallic copper in a reducing atmosphere to form an agglomerate porous layer, impregnating said porous body with a solution of cupric chloride ($CuCl_2$) acidified with hydrogen chloride, the said cupric chloride being converted by reaction with said porous copper body to cuprous chloride, and oven-drying the electrode thus produced until the weight thereof is constant, the impregnation and subsequent operations being repeated until a desired quantity of cuprous chloride is formed within the pores of said body.

3. A method of manufacture of electrodes as claimed in claim 2, in which said porous agglomerate layers, after impregnation with cupric chloride solution, are treated by cathodic electrolysis, the anode of the electrolytic bath being of copper and the electrolyte constituted by said solution of cupric chloride.

4. An electric battery of the kind referred to, said battery comprising a first shallow rectangular tray-shaped container of thermoplastic material comprising flat surfaces constituting the edges of said container, said container constituting one half of the external casing of said battery, a positive plate or electrode placed in said container, said positive plate consisting essentially of a thin porous sheet of sintered copper powder impregnated with cuprous chloride (CuCl), liquid absorbent means placed with said positive plate in said first container, a second shallow container comprising flat surfaces constituting the edges of said container substantially similar to said first container, a negative plate placed in said second container, said negative plate consisting substantially of magnesium, liquid absorbent material with said negative plate in said second container, a finely porous separator coextensive with said both containers and interposed between the said flat surfaces thereof which are sealed through said separator, copper wire connections welded one to each said positive and negative plates, said connection passing out of said casing between said sealed flat surfaces, and at least a passage formed in each said shallow container, through which the said battery, assembled in the dry state, may be activated for use by temporary immersion in an electrolyte.

5. An electric battery as claimed in claim 4, in which the said separator is constituted by a fine cotton fabric, and the said thermo-plastic material is polyvinyl chloride.

6. A method of producing a positive electrode for primary cells in which the active element is cuprous chloride, comprising the steps of producing a sintered porous copper body by sintering in a reducing atmosphere a thin, homogeneous and uniform layer of copper powder laid on a suitable holding member, of impregnating said sintered porous body with a concentrated cupric chloride solution slightly acidified by hydrochloric acid, drying said impregnated body, repeating said impregnation and the subsequent drying until the desired amount of cupric chloride is introduced into the pores of the said body and lastly allowing several days storage of the impregnated sintered body out of contact with air, thereby permitting a complete conversion of the impregnated cupric chloride into cuprous chloride by reaction with part of the copper of the sintered body.

7. A method according to claim 6 where the copper powder consists of minute crystals of interlacing form produced by electrolysis.

8. A method according to claim 6 where the holding member is a thin perforated copper sheet.

9. A method according to claim 6 where the holding member is a fine copper grid.

10. A method according to claim 6 where the holding member is a thin sheet of suitable material which is destroyed by the thermal action of the sintering operation.

11. A method according to claim 6 in which the porous body after complete impregnation with cupric chloride solution is submitted to cathodic electrolysis in an electrolytic bath, the anode of the electrolytic bath being of copper and the electrolyte thereof being a cupric chloride solution.

12. A positive electrode for primary cells which comprises a sintered porous copper body impregnated with cupric chloride which reacts with the copper of the body to yield cuprous chloride as active material.

13. Primary cells where the positive electrodes used comprise sintered porous copper bodies impregnated with cupric chloride which reacts with the copper of the bodies to yield cuprous chloride as active material.

14. A primary cell comprising a first shallow rectangular tray-shaped container of thermoplastic material comprising flat surfaces constituting the sides and the edges of said container, said container constituting one half of the external casing of said battery, a flat positive electrode placed in said container, and comprising essentially a sintered porous copper body impregnated with cupric chloride which reacts with the copper of the body to yield cuprous chloride as active material, liquid absorbent means placed with said positive electrode in said first container, a second container identical to the first, a flat negative electrode located thereon, said negative electrode consisting substantially of magnesium, liquid absorbent means placed with said negative electrode in said second container, a finely porous separator coextensive with said both containers and interposed between the said flat surfaces thereof which are sealed through said separator, copper wire connections welded one to each said positive and negative electrodes, said connections passing through and extending out of said casing between said sealed flat surfaces, and at least one opening formed in each shallow container, by means of which the said battery, assembled in the dry state may be activated for use by temporary immersion in an electrolyte.

15. A primary cell as claimed in claim 14 in which the said separator comprises a fine cotton fabric, and the said thermoplastic material is polyvinyl chloride.

References Cited in the file of this patent

UNITED STATES PATENTS

| Re. 23,883 | Chubb | Oct. 5, 1954 |
| 2,640,091 | Pucker et al. | May 26, 1953 |